(12) United States Patent
Shuai et al.

(10) Patent No.: US 12,477,727 B2
(45) Date of Patent: Nov. 18, 2025

(54) SEMICONDUCTOR MEMORY DEVICE HAVING A SYMMETRIC ACTIVE AREA LAYOUT STRUCTURE

(71) Applicant: UNITED MICROELECTRONICS CORP., Hsin-Chu (TW)

(72) Inventors: Hung-Hsun Shuai, Tainan (TW); Yu-Jen Yeh, Taichung (TW); Chih-Jung Chen, Hsinchu County (TW)

(73) Assignee: UNITED MICROELECTRONICS CORP., Hsin-Chu (TW)

( * ) Notice: Subject to any disclaimer, the term of this patent is extended or adjusted under 35 U.S.C. 154(b) by 904 days.

(21) Appl. No.: 17/565,484

(22) Filed: Dec. 30, 2021

(65) Prior Publication Data

US 2023/0171958 A1 Jun. 1, 2023

(30) Foreign Application Priority Data

Dec. 1, 2021 (CN) .......................... 202111451826.6

(51) Int. Cl.
*H10B 41/40* (2023.01)
*G11C 16/24* (2006.01)
*G11C 16/28* (2006.01)

(52) U.S. Cl.
CPC ............. *H10B 41/40* (2023.02); *G11C 16/24* (2013.01); *G11C 16/28* (2013.01)

(58) Field of Classification Search
CPC ........ H10B 41/40; H10B 41/42; H10B 41/10; G11C 16/24; G11C 16/28; G11C 16/0425; G11C 2216/04; H01L 29/40114; H01L 29/42328

USPC ......................................................... 257/213
See application file for complete search history.

(56) References Cited

U.S. PATENT DOCUMENTS

| | | | | |
|---|---|---|---|---|
| 11,527,543 B2 * | 12/2022 | Wu | ................ | H10D 30/68 |
| 2010/0008141 A1 * | 1/2010 | Chu | ................ | H10D 89/10 |
| | | | | 365/185.01 |
| 2010/0008150 A1 * | 1/2010 | Hazama | ............. | G11C 16/0483 |
| | | | | 365/185.25 |
| 2015/0263044 A1 * | 9/2015 | Yamasaki | ............. | H10B 41/20 |
| | | | | 257/67 |
| 2018/0233509 A1 * | 8/2018 | Cai | ................ | G11C 16/0425 |
| 2020/0083237 A1 * | 3/2020 | Cai | ................ | G11C 16/0408 |
| 2020/0176460 A1 * | 6/2020 | Decobert | ............. | G11C 16/16 |
| 2021/0066323 A1 * | 3/2021 | Huang | ............. | H10B 41/30 |
| 2021/0327512 A1 * | 10/2021 | Xing | ................ | G11C 16/08 |

FOREIGN PATENT DOCUMENTS

| | | | | |
|---|---|---|---|---|
| CN | 101005079 | | 7/2007 | |
| CN | 101625893 | | 1/2010 | |
| CN | 111341776 | | 6/2020 | |
| CN | 108630687 B | * | 11/2020 | ............. H10B 41/30 |
| KR | 20070005791 A | * | 1/2007 | |

* cited by examiner

Primary Examiner — Mohammad M Hoque
(74) Attorney, Agent, or Firm — Winston Hsu

(57) ABSTRACT

A semiconductor memory device includes a substrate, a plurality of memory cells and at least one strap cell between the plurality of memory cells disposed along a first direction, a plurality of bit line (BL) contacts electrically connected to a plurality of drain doped regions of the plurality of memory cells, respectively, and at least one source line contact electrically connected to a diffusion region of the strap cell. The at least one source line contact is aligned with the plurality of BL contacts in the first direction.

17 Claims, 4 Drawing Sheets

SEMICONDUCTOR MEMORY DEVICE HAVING A SYMMETRIC ACTIVE AREA LAYOUT STRUCTURE

BACKGROUND OF THE INVENTION

1. Field of the Invention

The present invention relates to the field of semiconductor technology, in particular to a flash memory device.

2. Description of the Prior Art

A flash memory is a type of memory that can be erased and reprogrammed in blocks instead of one byte at a time. A typical flash memory comprises a memory array, which includes a large number of memory cells. Each of the memory cells includes a floating gate field-effect transistor capable of holding charge. The cells are usually grouped into blocks. Each of the cells within a block can be electrically programmed in a random basis by charging the floating gate. The data in a cell is determined by the presence or absence of the charge in the floating gate. The charge can be removed from the floating gate by a block erase operation.

Common types of flash memory cells include stacked-gate flash memory cells and split-gate flash memory cells (e.g., a third generation SUPERFLASH (ESF3) memory cell). Split-gate flash memory cells have lower power consumption, higher injection efficiency, less susceptibility to short channel effects, and over erase immunity compared to stacked-gate flash memory cells. However, the disadvantage of the existing ESF3 memory cell is that it is necessary to provide a source line contact on the strap cell between two adjacent control gate lines, which may lead to shorting between the erase gate line and the source line.

SUMMARY OF THE INVENTION

It is one object of the present invention to provide an improved semiconductor memory device to solve the above-mentioned shortcomings or deficiencies of the prior art.

One aspect of the invention provides a semiconductor memory device including a substrate; and a plurality of device lines comprising a select gate (SG) line, a control gate (CG) line, an erase gate (EG) line, and a source line elongated in parallel along a first direction. The CG line is disposed between the EG line and the SG line, and the source line underlies the EG line in the substrate. The plurality of device lines defines a plurality of memory cells and at least one strap cell between the plurality of memory cells spaced along lengths of the device lines. A plurality of bit line (BL) contacts is electrically connected to a plurality of drain doped regions of the plurality of memory cells respectively. The plurality of drain doped regions is adjacent to the SG line. At least one source line contact is electrically connected to a diffusion region of the strap cell under the SG line. The at least one source line contact is aligned with the plurality of BL contacts in the first direction.

According to some embodiments, each of the plurality of memory cells comprises a floating gate disposed under the CG line.

According to some embodiments, the diffusion region of the strap cell is a heavily doped region.

According to some embodiments, the diffusion region extends in a second direction to a region directly under the CG line.

According to some embodiments, the strap cell comprises an asymmetric active area layout structure According to some embodiments, the asymmetric active area layout structure comprises a longer active area elongated along the second direction, a shorter active area elongated along the second direction and in parallel with the longer active area, and an intermediate active area connecting the longer active area with the shorter active area.

According to some embodiments, the at least one source line contact is disposed on a distal end portion of the longer active area.

According to some embodiments, no contact is disposed on the intermediate active area and no discontinuity is disposed in the EG line directly above the at least one strap cell.

According to some embodiments, each of the plurality of memory cells comprises a first gate dielectric layer between the SG line and the substrate, and the at least one strap cell comprises a second gate dielectric layer between the SG line and the substrate, wherein the second gate dielectric layer is thicker than the first gate dielectric layer.

According to some embodiments, the at least one strap cell comprises a dummy floating gate under the CG line, and an always-on floating gate channel directly under the dummy floating gate.

Another aspect of the invention provides a semiconductor memory device including a substrate; a plurality of memory cells and at least one strap cell between the plurality of memory cells disposed along a first direction; a plurality of bit line (BL) contacts electrically connected to a plurality of drain doped regions of the plurality of memory cells, respectively; and at least one source line contact electrically connected to a diffusion region of the strap cell. The at least one source line contact is aligned with the plurality of BL contacts in the first direction.

According to some embodiments, the semiconductor memory device further includes a plurality of device lines comprising a select gate (SG) line, a control gate (CG) line, an erase gate (EG) line, and a source line elongated in parallel along the first direction. The CG line is disposed between the EG line and the SG line, and the source line underlies the EG line in the substrate.

According to some embodiments, the plurality of memory cells and the at least one strap cell are disposed along lengths of the device lines.

According to some embodiments, the plurality of drain doped regions is adjacent to the SG line.

According to some embodiments, each of the plurality of memory cells comprises a floating gate disposed under the CG line.

According to some embodiments, each of the plurality of memory cells comprises a first gate dielectric layer between the SG line and the substrate, and the at least one strap cell comprises a second gate dielectric layer between the SG line and the substrate, wherein the second gate dielectric layer is thicker than the first gate dielectric layer.

According to some embodiments, the diffusion region of the strap cell is a heavily doped region, wherein the diffusion region extends in a second direction to a region directly under the CG line.

According to some embodiments, the strap cell comprises an asymmetric active area layout structure.

According to some embodiments, the asymmetric active area layout structure comprises a longer active area elongated along the second direction, a shorter active area elongated along the second direction and in parallel with the longer active area, and an intermediate active area connecting the longer active area with the shorter active area.

According to some embodiments, the at least one source line contact is disposed on a distal end portion of the longer active area.

These and other objectives of the present invention will no doubt become obvious to those of ordinary skill in the art after reading the following detailed description of the preferred embodiment that is illustrated in the various figures and drawings.

DETAILED DESCRIPTION

In the following detailed description of the disclosure, reference is made to the accompanying drawings, which form a part hereof, and in which is shown, by way of illustration, specific embodiments in which the invention may be practiced. These embodiments are described in sufficient detail to enable those skilled in the art to practice the invention.

Other embodiments may be utilized, and structural, logical, and electrical changes may be made without departing from the scope of the present invention. Therefore, the following detailed description is not to be considered as limiting, but the embodiments included herein are defined by the scope of the accompanying claims.

Figure 1:
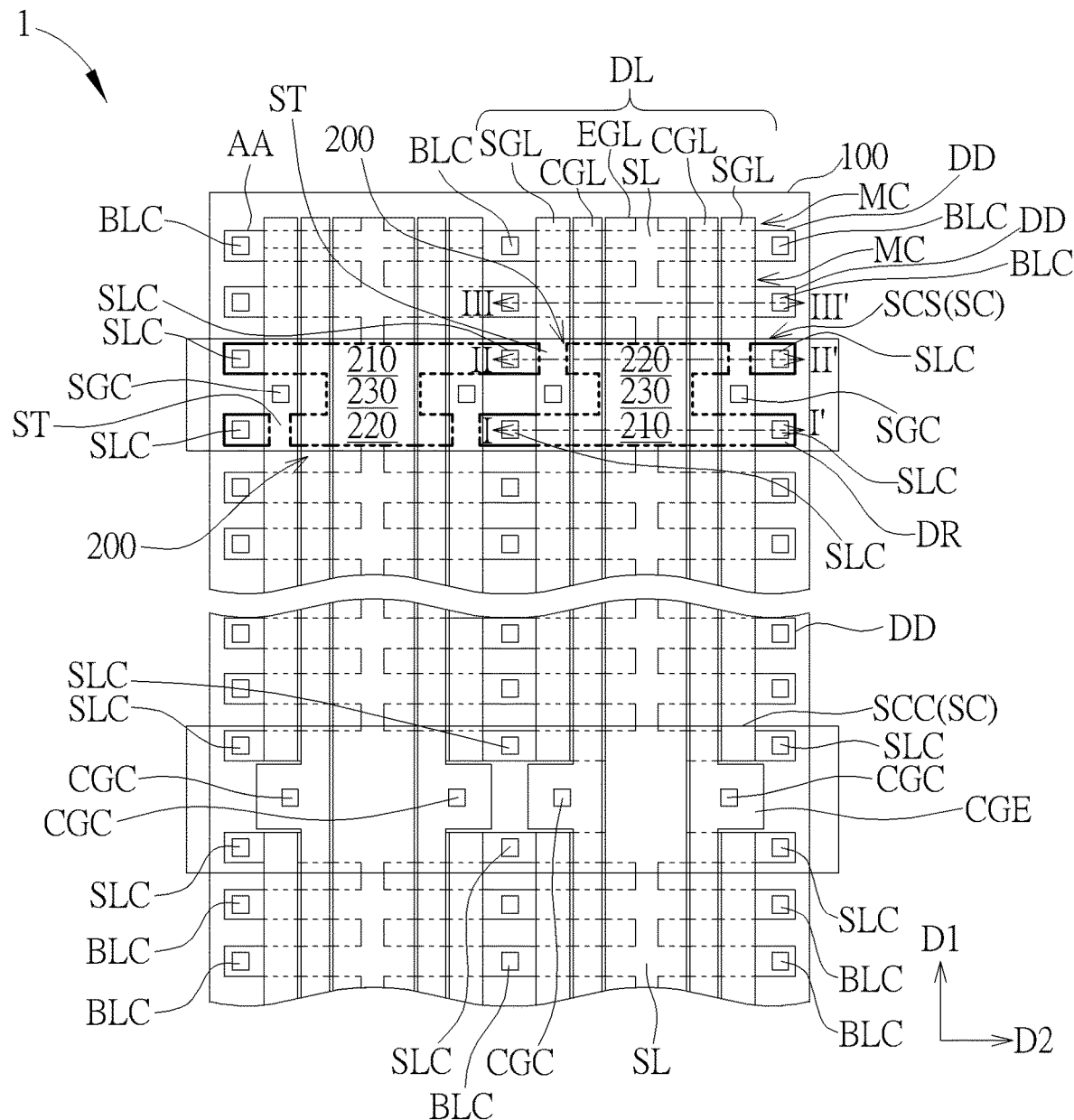
FIG. 1 is a schematic diagram of a partial layout of a semiconductor memory device according to an embodiment of the present invention.
Figure 2:
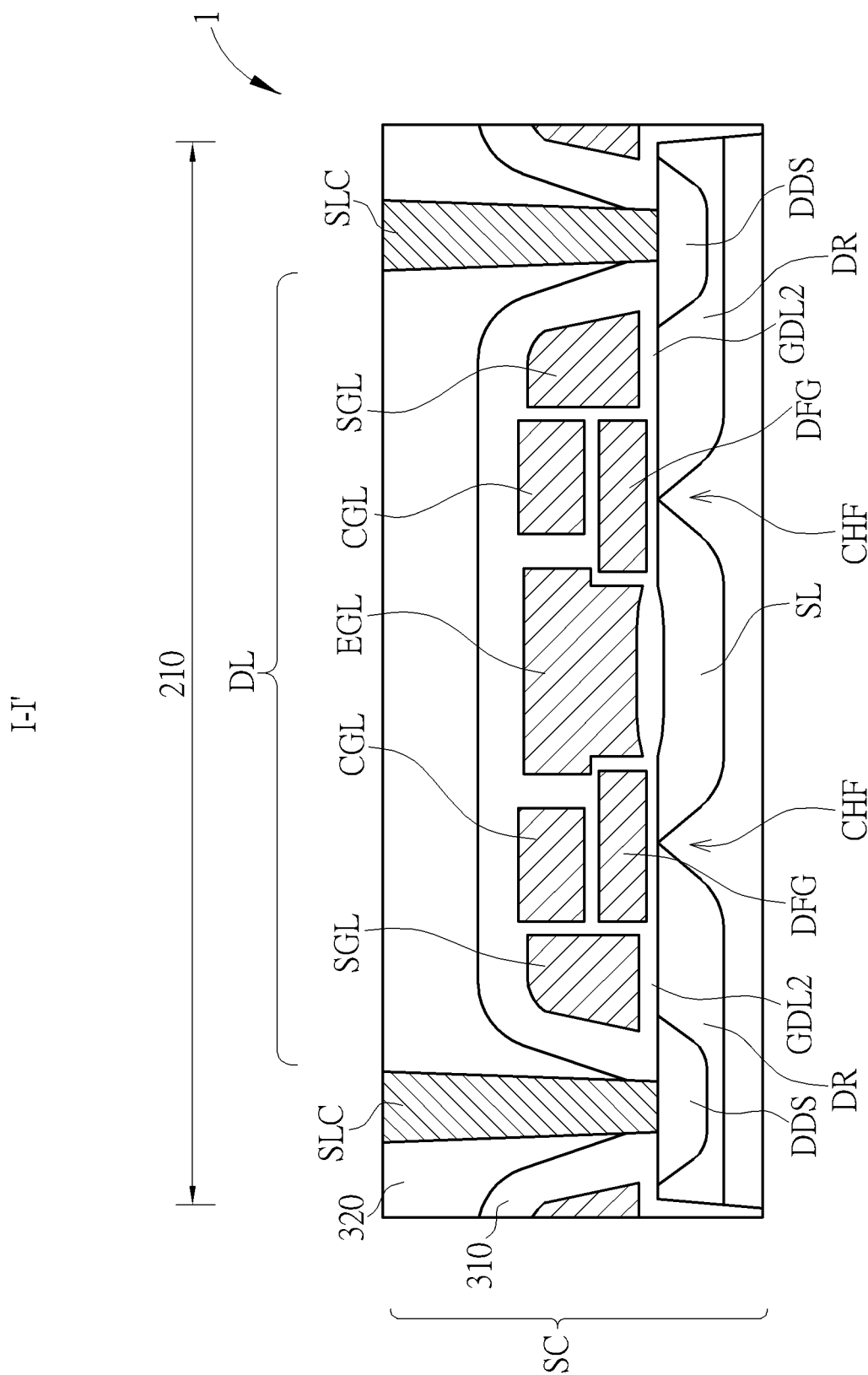
FIG. 2 to FIG. 4 are schematic cross-sectional views taken along lines I-I', II-II', and III-III' in FIG. 1, respectively.
Figure 3:
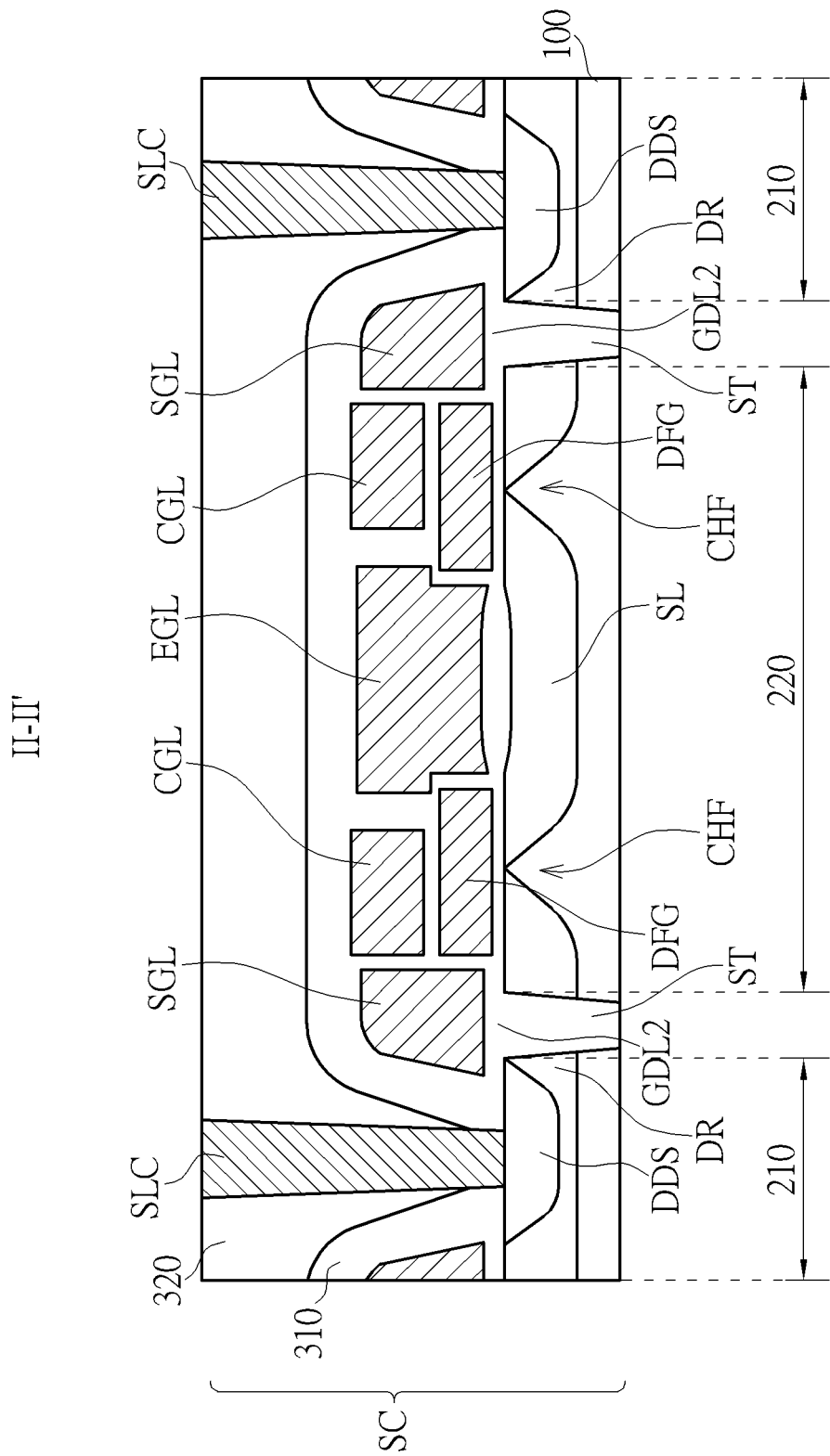
Figure 4:
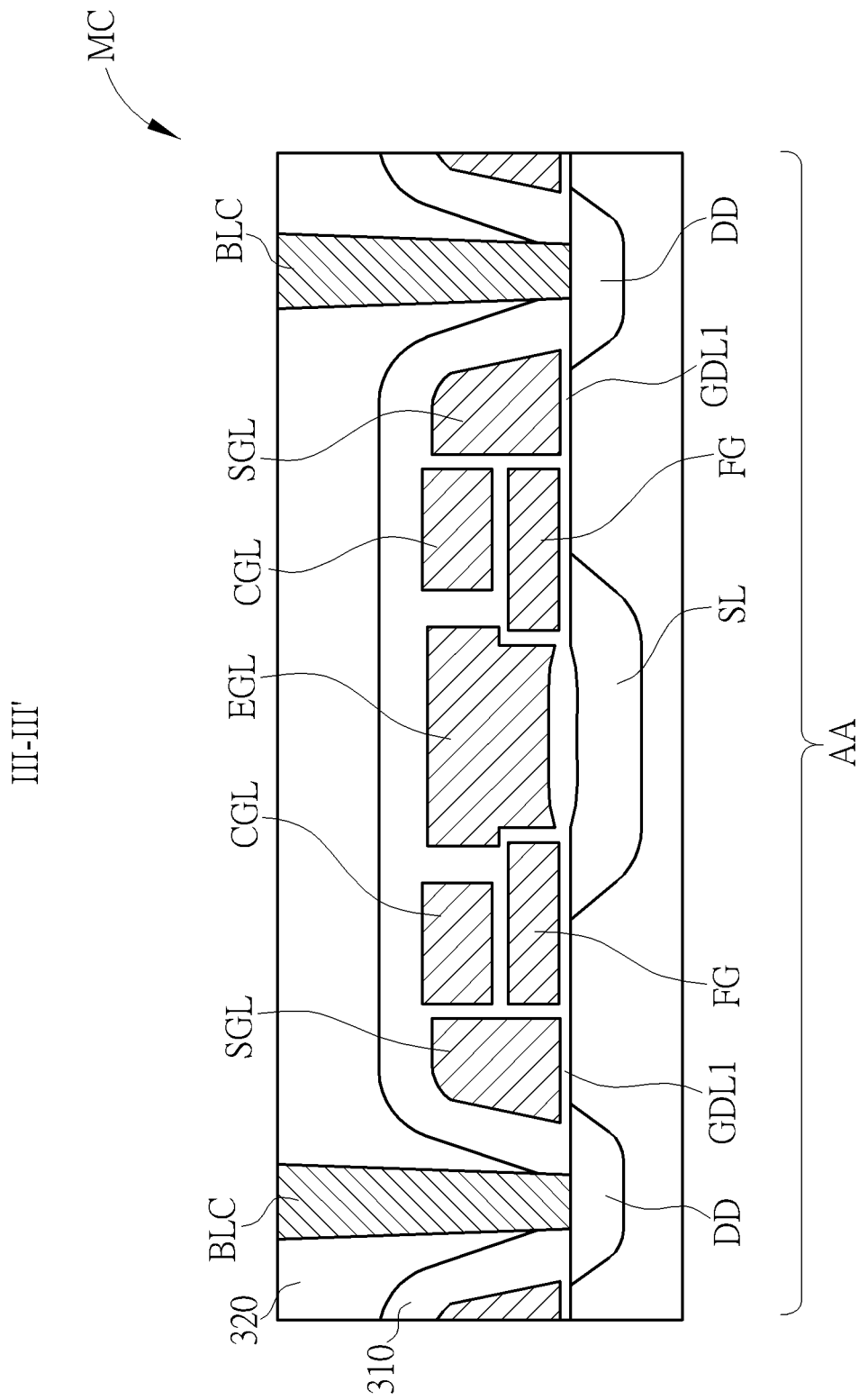

Please refer to FIG. 1 to FIG. 4. FIG. 1 is a schematic diagram of a partial layout of a semiconductor memory device 1 according to an embodiment of the present invention. FIG. 2 to FIG. 4 are schematic cross-sectional views taken along line I-I'II-II', and III-III', respectively, in FIG. 1. As shown in FIG. 1 to FIG. 4, the semiconductor memory device 1 includes a substrate 100, such as a P-type doped silicon substrate, but is not limited thereto. A plurality of device lines DL is provided on the substrate 100, including a select gate line SGL, a control gate line CGL, an erase gate line EGL, and a source line SL extending in parallel along the first direction D1. The control gate line CGL is arranged between the erase gate line EGL and the select gate line SGL, and the source line SL is located in the substrate 100 directly below the erase gate line EGL.

As can be seen from FIG. 1, in the substrate 100, the source line SL extending along the first direction D1 intersects a plurality of elongated active regions AA extending along the second direction D2. According to an embodiment of the present invention, the source line SL may be a heavily doped region formed in the substrate 100, for example, an $N^+$ heavily doped region.

According to an embodiment of the present invention, as shown in FIG. 1, the plurality of device lines DL define a plurality of spaced memory cells MC (formed on each elongated active area AA) and at least one strap cell SC located between the memory cells MC along lengths (or first direction D1) of the device lines DL. For example, a select gate contact SGC can be formed on the strap cell SCS and a control gate contact CGC can be formed on the strap cell SCC. The control gate contact CGC may be provided on the extension CGE extending outward along the second direction D2 from the control gate line CGL.

According to an embodiment of the present invention, a plurality of bit line contacts BLC may be provided in the first direction D1, which are respectively electrically connected to the drain doped regions DD of the memory cells MC. The drain doped regions DD are adjacent to the select gate line SGL. According to an embodiment of the present invention, the semiconductor memory device 1 further includes at least one source line contact SLC, which is electrically connected to the diffusion region DR of the strap cell SC under the select gate line SGL. According to an embodiment of the present invention, the diffusion region DR of the strap cell SC is a heavily doped region, for example, an $N^+$ heavily doped region. According to an embodiment of the present invention, as shown in FIG. 1 and FIG. 2, the diffusion region DR continuously extends along the second direction D2 to the area directly below the control gate line CGL.

According to an embodiment of the present invention, as shown in FIG. 1, the source line contact SLC is substantially aligned with the bit line contacts BLC in the first direction D1. According to an embodiment of the present invention, as shown in FIG. 4, each memory cell MC includes a floating gate FG disposed under the control gate line CGL. According to an embodiment of the present invention, as shown in FIG. 2 and FIG. 3, the strap cell SC includes a dummy floating gate DFG below the control gate line CGL, and an always-on floating gate channel CHF directly below the dummy floating gate DFG.

According to an embodiment of the present invention, as shown in FIG. 4, each memory cell MC includes a first gate dielectric layer GDL1 between the select gate line SGL and the substrate 100. According to an embodiment of the present invention, as shown in FIG. 2, the strap cell SC includes a second gate dielectric layer GDL2 between the select gate line SGL and the substrate 100. According to an embodiment of the present invention, the second gate dielectric layer GDL2 is thicker than the first gate dielectric layer GDL1.

As shown in FIG. 2 to FIG. 4, an etch stop layer 310 and an interlayer dielectric layer 320 may be deposited on the substrate 100. The etch stop layer 310 conformally covers the select gate line SGL, the control gate line CGL, and the erase gate line EGL. The interlayer dielectric layer 320 covers the etch stop layer 310. According to an embodiment of the present invention, the source line contact SLC penetrates through the interlayer dielectric layer 320 and the etch stop layer 310, and is electrically connected to the diffusion region DR located under the select gate line SGL.

According to an embodiment of the present invention, as shown in FIG. 1, the strap cell SC includes an asymmetric active area layout structure 200. According to an embodiment of the present invention, the asymmetric active area layout structure 200 includes a longer active area 210 elongated in the second direction D2, a shorter active area 220 elongated in the second direction D2 and parallel to the longer active area 210, and an intermediate active area 230 connecting the longer active area 210 and the shorter active area 220. As shown in FIG. 1 and FIG. 3, in the second direction D2, a shallow trench isolation structure ST is provided between the shorter active area 220 and the adjacent longer active area 210 in the same row, so as to avoid disturbance during program operation.

According to an embodiment of the present invention, as shown in FIG. 1 and FIG. 2, the source line contact SLC is disposed on the heavily doped region DDS located at a distal end portion of the longer active region 210 in the second direction D2, and is aligned with the bit line contacts BLC in the first direction D1. According to an embodiment of the present invention, no contact is provided directly above the intermediate active area 230, and no discontinuity is provided in the erase gate line EGL directly above the strap cell SC. In other words, the erase gate line EGL continuously passes through the strap cells SC. Since there is no need to provide discontinuities or openings in the erase gate line EGL directly above the strap cell SC, the problem of shorting between the erase gate line EGL and the source line SL can be effectively avoided.

The semiconductor memory device 1 of the present invention includes: a substrate 100; memory cells MC arranged along a first direction D1 and a strap cell SC located between the memory cells MC; bit line contacts BLC respectively electrically connected to drain doped regions DD of the memory cells MC; and source line contact SLC electrically connected to a diffusion region DR of the strap cell SC. According to an embodiment of the present invention, the source line contact SLC and the bit line contacts BLC are aligned in the first direction D1.

According to an embodiment of the present invention, the semiconductor memory device 1 further includes device lines DL, including a select gate line SGL, a control gate line CGL, an erase gate line EGL, and a source line SL extending in parallel along the first direction D1. The control gate line CGL is arranged between the erase gate line EGL and the select gate line SGL, and the source line SL is located in the substrate 100 under the erase gate line EGL.

According to an embodiment of the present invention, the memory cells MC and the strap cell SC are arranged along the length of the device lines DL.

According to an embodiment of the present invention, the drain doped regions DD are adjacent to the select gate line SGL.

According to an embodiment of the present invention, each memory cell MC includes a floating gate FG disposed under the control gate line CGL.

According to an embodiment of the present invention, each memory cell MC includes a first gate dielectric layer GDL1 between the select gate line SGL and the substrate 100, and the strap cell SC includes a second gate dielectric layer GDL2 between the select gate line SGL and the substrate 100. The second gate dielectric layer GDL2 is thicker than the first gate dielectric layer GDL1.

According to an embodiment of the present invention, the diffusion region DR of the strap cell SC is a heavily doped region. The diffusion region DR extends along the second direction D2 to an area directly below the control gate line CGL.

According to an embodiment of the present invention, the strap cell SC includes an asymmetric active area layout structure 200.

According to an embodiment of the present invention, the asymmetric active area layout structure 200 includes a longer active area 210 elongated in the second direction D2, a shorter active area 220 elongated in the second direction D2 and parallel to the longer active area 210, and an intermediate active area 230 connecting the longer active area 210 with the shorter active area 220.

According to an embodiment of the present invention, the source line contact SLC is provided on the distal end portion of the longer active area 210.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A semiconductor memory device, comprising:
   a substrate;
   a plurality of device lines comprising a select gate (SG) line, a control gate (CG) line, an erase gate (EG) line, and a source line elongated in parallel along a first direction, wherein the CG line is disposed between the EG line and the SG line, and the source line underlies the EG line in the substrate, wherein the plurality of device lines defines a plurality of memory cells and at least one strap cell between the plurality of memory cells spaced along lengths of the device lines;
   a plurality of bit line (BL) contacts electrically connected to a plurality of drain doped regions of the plurality of memory cells respectively, wherein the plurality of drain doped regions is adjacent to the SG line; and
   at least one source line contact electrically connected to a diffusion region of the strap cell under the SG line, wherein the at least one source line contact is aligned with the plurality of BL contacts in the first direction, wherein the at least one strap cell comprises a dummy floating gate under the CG line, and an always-on floating gate channel directly under the dummy floating gate.

2. The semiconductor memory device according to claim 1, wherein each of the plurality of memory cells comprises a floating gate disposed under the CG line.

3. The semiconductor memory device according to claim 1, wherein the diffusion region of the strap cell is a heavily doped region.

4. The semiconductor memory device according to claim 3, wherein the diffusion region extends in a second direction to a region directly under the CG line.

5. The semiconductor memory device according to claim 4, wherein the strap cell comprises an asymmetric active area layout structure.

6. The semiconductor memory device according to claim 5, wherein the asymmetric active area layout structure comprises a longer active area elongated along the second direction, a shorter active area elongated along the second direction and in parallel with the longer active area, and an intermediate active area connecting the longer active area with the shorter active area.

7. The semiconductor memory device according to claim 6, wherein the at least one source line contact is disposed on a distal end portion of the longer active area.

8. The semiconductor memory device according to claim 6, wherein no contact is disposed on the intermediate active area and no discontinuity is disposed in the EG line directly above the at least one strap cell.

9. The semiconductor memory device according to claim 1, wherein each of the plurality of memory cells comprises a first gate dielectric layer between the SG line and the substrate, and the at least one strap cell comprises a second gate dielectric layer between the SG line and the substrate, wherein the second gate dielectric layer is thicker than the first gate dielectric layer.

10. A semiconductor memory device, comprising:
    a substrate;
    a plurality of memory cells and at least one strap cell between the plurality of memory cells disposed along a first direction, wherein the at least one strap cell comprises an asymmetric active area layout structure;
    a plurality of bit line (BL) contacts electrically connected to a plurality of drain doped regions of the plurality of memory cells, respectively; and at least one source line contact electrically connected to a diffusion region of the at least one strap cell, wherein the at least one source line contact is aligned with the plurality of BL contacts in the first direction, wherein the diffusion region extends in a second direction to a region directly under the CG line, wherein the asymmetric active area layout structure comprises a longer active area elongated along the second direction, a shorter active area elongated along the second direction and in parallel with the longer active area, and an intermediate active area connecting the longer active area with the shorter active area.

11. The semiconductor memory device according to claim 10 further comprising a plurality of device lines comprising a select gate (SG) line, a control gate (CG) line, an erase gate (EG) line, and a source line elongated in parallel along the first direction, wherein the CG line is disposed between the EG line and the SG line, and the source line underlies the EG line in the substrate.

12. The semiconductor memory device according to claim 11, wherein the plurality of memory cells and the at least one strap cell are disposed along lengths of the device lines.

13. The semiconductor memory device according to claim 11, wherein the plurality of drain doped regions is adjacent to the SG line.

14. The semiconductor memory device according to claim 11, wherein each of the plurality of memory cells comprises a floating gate disposed under the CG line.

15. The semiconductor memory device according to claim 11, wherein each of the plurality of memory cells comprises a first gate dielectric layer between the SG line and the substrate, and the at least one strap cell comprises a second gate dielectric layer between the SG line and the substrate, wherein the second gate dielectric layer is thicker than the first gate dielectric layer.

16. The semiconductor memory device according to claim 10, wherein the diffusion region of the strap cell is a heavily doped region.

17. The semiconductor memory device according to claim 10, wherein the at least one source line contact is disposed on a distal end portion of the longer active area.

* * * * *